(12) United States Patent
Mohler

(10) Patent No.: US 8,760,275 B2
(45) Date of Patent: Jun. 24, 2014

(54) OBSTACLE WARNING SYSTEM AND METHOD

(75) Inventor: David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 356 days.

(21) Appl. No.: 13/087,601

(22) Filed: Apr. 15, 2011

(65) Prior Publication Data

US 2012/0264406 A1 Oct. 18, 2012

(51) Int. Cl.
*B60Q 1/00* (2006.01)
*G08G 1/123* (2006.01)
*G08B 21/00* (2006.01)
*H04M 11/04* (2006.01)

(52) U.S. Cl.
USPC ..... 340/435; 340/989; 340/686.1; 455/404.1; 455/404.2

(58) Field of Classification Search
CPC ........ B60Q 1/525; B60Q 5/006; G08G 1/123; G08G 1/144; B60R 2021/0027; B60R 21/013; B60R 2325/105
USPC .......... 340/435, 989, 686.1; 455/404.1, 404.2
See application file for complete search history.

(56) References Cited

U.S. PATENT DOCUMENTS

| | | | | |
|---|---|---|---|---|
| 5,552,773 | A * | 9/1996 | Kuhnert | 340/573.1 |
| 6,345,233 | B1 * | 2/2002 | Erick | 701/301 |
| 7,996,044 | B2 * | 8/2011 | Hamada et al. | 455/566 |
| 8,200,238 | B2 * | 6/2012 | Gildea | 455/456.1 |
| 8,547,249 | B2 * | 10/2013 | David et al. | 340/903 |
| 2002/0022925 | A1 | 2/2002 | Okada | |
| 2007/0182538 | A1 * | 8/2007 | Ota et al. | 340/506 |
| 2008/0224837 | A1 | 9/2008 | Meyer et al. | |
| 2009/0002197 | A1 * | 1/2009 | Cemper | 340/989 |
| 2009/0089677 | A1 * | 4/2009 | Chan | 715/719 |
| 2009/0134988 | A1 * | 5/2009 | Nath et al. | 340/436 |
| 2009/0160628 | A1 | 6/2009 | Baynard et al. | |
| 2010/0045666 | A1 * | 2/2010 | Kornmann et al. | 345/419 |
| 2010/0217527 | A1 | 8/2010 | Hattori et al. | |
| 2011/0001635 | A1 * | 1/2011 | Akens et al. | 340/936 |
| 2011/0021234 | A1 * | 1/2011 | Tibbitts et al. | 455/517 |
| 2011/0143816 | A1 * | 6/2011 | Fischer | 455/566 |
| 2012/0265977 | A1 * | 10/2012 | Ewell et al. | 713/100 |
| 2014/0004840 | A1 * | 1/2014 | Ewell et al. | 455/418 |

OTHER PUBLICATIONS

Lane, Nicholas, et al., "A Survey of Mobile Phone Sensing," IEEE Communications Magazine, Sep. 2010, pp. 140-150.

(Continued)

*Primary Examiner* — George Bugg
*Assistant Examiner* — Munear Akki

(57) ABSTRACT

As a user is interacting with a mobile device, the user is sometimes distracted from impending obstacles that may be approaching the user. The mobile device can detect an approaching obstacle and can determine that the user is also interacting with the mobile device. Upon detecting these two events, the user of the mobile device is notified of the approaching obstacle using various notification methods, such as displaying a message to the user or using an audible sound or message. The notification can also include interrupting an application on the mobile device, such as a video game, to display a message to the user of the approaching obstacle. The system and method also comprise a distributed architecture where detection of the approaching obstacle is accomplished external to the mobile device. For example, a detection module in an automobile or airplane can be used to detect approaching obstacles.

19 Claims, 7 Drawing Sheets

(56) References Cited

OTHER PUBLICATIONS

Peng, En, et al., "A Smartphone-Based Obstacle Sensor for the Visually Impaired," UIC 2010, LNCS 6406, pp. 590-604, Springer-Verlag, Berlin Heidelberg 2010.

Casper, "Write Text Messages While Walking With TransparentSMS," website: http://www.technorotic.com/2010/09/write-text-messages-while-w . . ., Sep. 9, 2010 (printed on Mar. 2, 2011), 8 pages.

* cited by examiner

OBSTACLE WARNING SYSTEM AND METHOD

TECHNICAL FIELD

The system and method relates to notification systems and in particular to notification systems for users of mobile devices.

BACKGROUND

With the proliferation of mobile devices in today's society, users of mobile devices have become distracted from events that are occurring around them. For example, automobile accidents occur when a user of a telephone was texting from or talking on their telephone. The user of the telephone was distracted from driving by their use of the telephone, thus causing the accident. This can be even further exacerbated where the user may have headphones or ear-buds on that prevent the user from hearing warnings, such as a horn, sirens, and the like.

Other common events are where a person is playing a game and/or selecting music tracks on a mobile device while walking or doing some other activity. The person is unaware of approaching obstacles, such as curbs, other people, cracks in a sidewalk, poles, raised surfaces, traffic lights, intersections, and the like. The distraction can cause the person to stumble, fall, or collide with the obstacle. What is needed is a system that can detect that the user is distracted by their interaction with their mobile device and provide an appropriate warning to the user of the mobile device.

SUMMARY

The system and method are directed to solving these and other problems and disadvantages of the prior art. As a user is interacting with a mobile device, the user is sometimes distracted from impending obstacles that they may be approaching or may be approaching the user. The mobile device can detect an approaching obstacle and can determine that the user is also interacting with the mobile device. Upon detecting these two events, the user of the mobile device is notified of the approaching obstacle using various notification methods, such as displaying a message to the user and/or using an audible sound or message. The notification can also include interrupting an application on the mobile device, such as a video game, calendar, email queue, or the like to display a message to the user of the approaching obstacle.

The system and method also comprise a distributed architecture where detection of the approaching obstacle is accomplished external to the mobile device. For example, a detection module in an automobile or airplane can be used to detect approaching obstacles. This can be used together with detection of the user interaction with the mobile device and notification accomplished by components that are either internal or external to the mobile device. Other embodiments allow for the registration of multiple mobile devices for applications, such as in an automobile where there may be multiple persons that are interacting with their mobile devices. For example, a driver and one or more passengers can be notified of an impending obstacle.

BRIEF DESCRIPTION OF THE DRAWINGS

In order to describe the manner in which other advantages and features of the disclosure can be obtained, a more particular description of the principles briefly described below will be rendered by reference to specific embodiments thereof, which are illustrated in the appended drawings. Understanding that these drawings depict only exemplary embodiments of the disclosure and are not therefore to be considered to be limiting of its scope; the principles herein are described and explained with additional specificity and detail through the use of the accompanying drawings in which:

FIG. 5 is a flow diagram of a method for interrupting an application that a user is interacting with.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
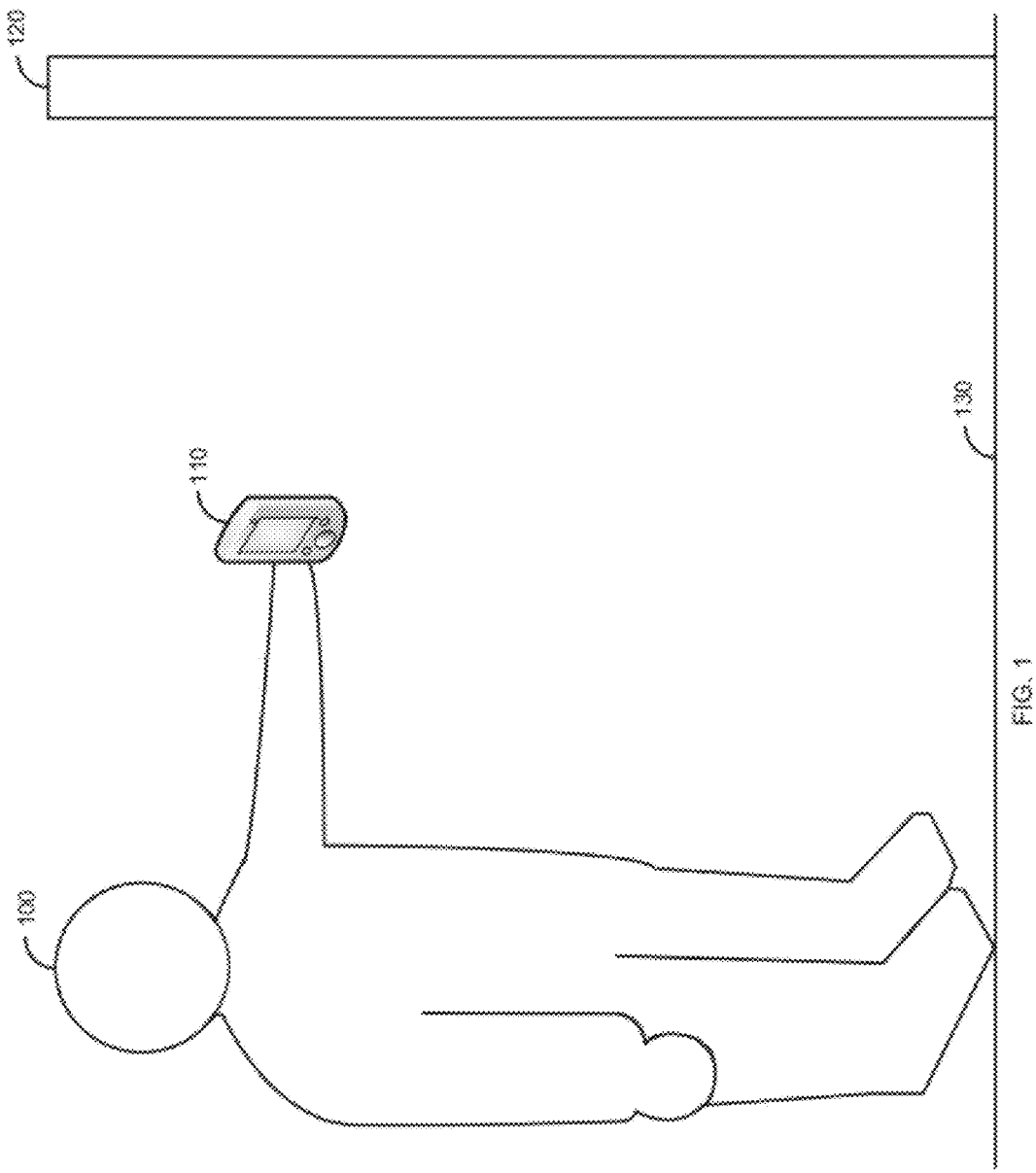
FIG. 1 is a diagram of a user interacting with a mobile device.

FIG. 1 is a diagram of user 100 interacting with mobile device 110. FIG. 1 comprises user 100, mobile device 110, impending obstacle 120, and surface 130. Mobile device 110 can be any type of mobile device, such as a telephone, a laptop computer, a Personal Digital Assistant (PDA), a tablet device, a music player, a video game player, and the like. Impending obstacle 120 is shown as a pole in FIG. 1, but impending obstacle 120 can be any type of obstacle, such as an automobile, a crack in a sidewalk, a raised surface, a curb, a vehicle, another person, a building, and the like. Surface 130 can be any type of surface, such as a sidewalk, a street, a path, a road, a floor, and the like.

User 100 in this illustrative example is walking on surface 130 while interacting with mobile device 110. User 100 can interact with mobile device 110 in various ways, such as by making a call, talking on a phone, using an application, playing a video game, viewing a video, using a keyboard or keypad, and the like. Since user 110 is interacting with mobile device 110, user 100 is typically unaware of impending obstacle 120.

Impending obstacle 120 can approach user 100 in various ways. Approach means "to come near or nearer to" (Collins English Dictionary—Complete & Unabridged 10th Edition). For example, impending obstacle 120 can approach user 100 by user 100 walking towards impending obstacle 120. Impending obstacle 120 can approach user 100 by impending obstacle 120 moving towards user 100 (i.e., an automobile moving towards user 100). Impending obstacle 120 can approach user 100 by both user 100 and impending obstacle 120 moving towards each other. Impending obstacle 120 is shown in front of user 100. However, impending obstacle 120 can approach user 100 from behind. For example, a person or an automobile can approach user 100 from behind. Similarly, impending obstacle 120 and/or user 100 can approach each other from a side or at any angle. Basically, impending obstacle 120 approaches user 100 where the distance between the two becomes smaller.

Figure 2:
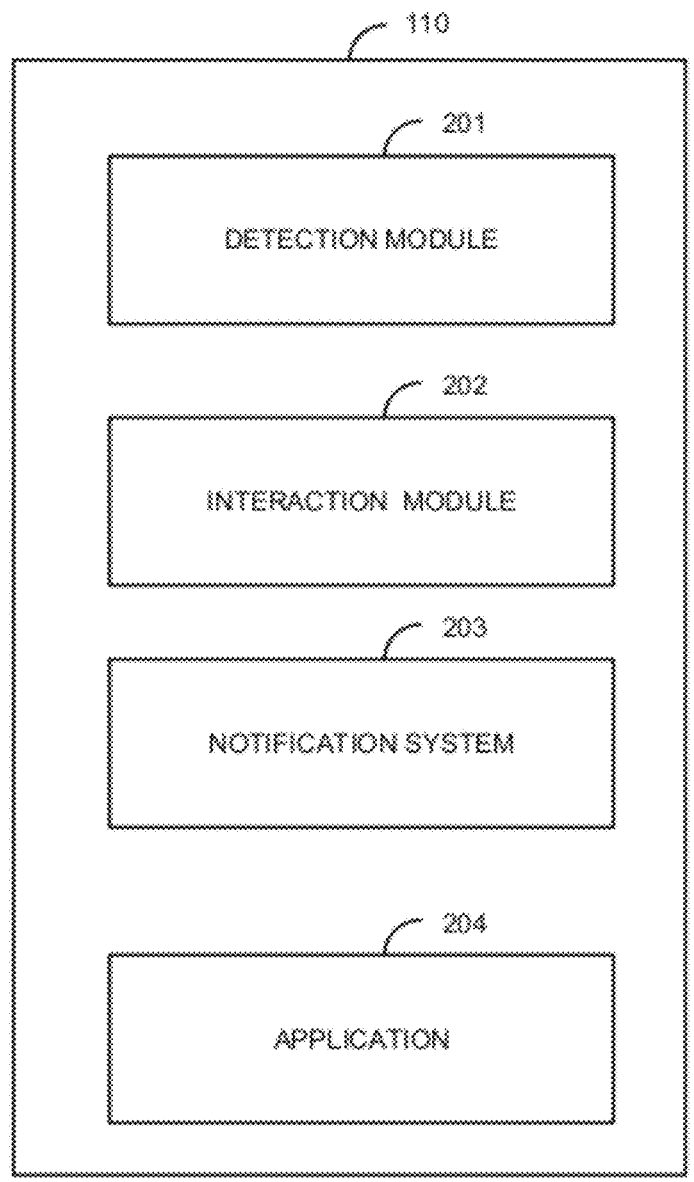
FIG. 2 is a block diagram of a first illustrative system for detecting an approaching impending obstacle and warning a user of a mobile device of the approaching impending obstacle.

FIG. 2 is a block diagram of a first illustrative system for detecting an approaching impending obstacle 120 and warning a user 100 of mobile device 110 of the approaching impending obstacle 120. Mobile device 110 comprises detection module 201, interaction module 202, notification system 203, and application 204.

Detection module 201 can be any type of hardware/software that can detect obstacles. For example, detection module 201 can comprise one or more video cameras in mobile device 110. Detection module 201 can use other types of sensors that can use a variety of known techniques, such as infrared, high frequency echo location, Global Positioning Satellite (GPS) coordinates, sound recognition, voice recognition, and the like, to detect impending obstacles 120. For example, detection module 201 can detect sounds, such as a car honking, a person saying a defined phrase such as "watch out", and the like.

Interaction module 202 can be any type of hardware/software that can be used to detect that user 100 is interacting with mobile device 110. For example, interaction module 202 can be a touch screen in mobile device 110 that can detect that user 100 is interacting with mobile device 110 by touching the touch screen. Interaction module 202 can be a camera that detects that user 100 is gazing (interacting with) at mobile device 110. Interaction module 202 can include other types of sensing mechanisms, such as a microphone, voice recognition software, a track ball, a touch pad, and the like.

Notification system 203 can be any type of hardware/software that can be used to notify user 100. For instance, notification system 203 can include one or more devices, such as a display, a touch screen, a speaker, a vibrator, a buzzer, and the like.

Application 204 can be any hardware/software that is used in conjunction with mobile device 110. For example, application 204 can be an operating system, a telephony application, a video game, a video conferencing application, a web browser, a word processing application, a spreadsheet, a music player, a video player, and the like. Application 204 can comprise two or more applications 204. For instance, application 204 can be an operating system that further includes an application 204 to display a video stream.

As illustrated in FIG. 1, user 100 is interacting with mobile device 110. Interaction module 202 determines that user 100 is interacting with mobile device 110. Detection module 201 detects that an impending obstacle 120 is approaching user 100 of mobile device 110. Upon detecting that user 100 is interacting with mobile device 110 and that impending obstacle 120 is approaching the user 100 of the mobile device 110, notification system 203 notifies user 100 of the approaching impending obstacle 120.

To further illustrate how the system of FIG. 2 works, consider the following example. Assume that user 100 is walking as shown in FIG. 1 and that user 100 holds mobile device 110 in a similar manner as shown in FIG. 1. Mobile device 110 contains one or more cameras (detection module 201) that are active when user 100 is interacting with mobile device 110. The camera(s) can be mounted on the back of mobile device 110 and/or on the front of mobile device 110. Mobile device 110 also contains a touch screen (interaction module 202) that user 100 interacts with by pressing soft keys. The touch screen determines that user 100 is interacting with mobile device 110 each time user 100 touches the touch screen and/or soft keys. An interaction can be determined by a defined time period since user 100 has touched the touch screen.

The camera(s) detects that an impending obstacle 120 is approaching user 100 as user 100 walks toward impending obstacle 120. An obstacle can be considered impending based on various conditions, such as how far away the obstacle is, how high the obstacle is, the size of the obstacle, features of the obstacle, sounds made by the obstacle, a combination of these, and the like. The parameters for defining an impending obstacle 120 can be predefined or can be user 100 configurable.

Upon detecting impending obstacle 120 and determining that user 100 is interacting with mobile device 110, notification system 203 notifies user 100 of impending obstacle 120. Notification system 203 can notify user 100 in different ways. For example, notification system 203 can display a text message on the touch screen, display an image on the touch screen, notify user 100 with an audible message or audible alarm, vibrate mobile device 110, and/or the like. Alternatively, if user 100 were interacting with application 204, such as a video game, notification system 203 can interrupt the video game by displaying a message on the touch screen on top of the video game.

Figure 3:
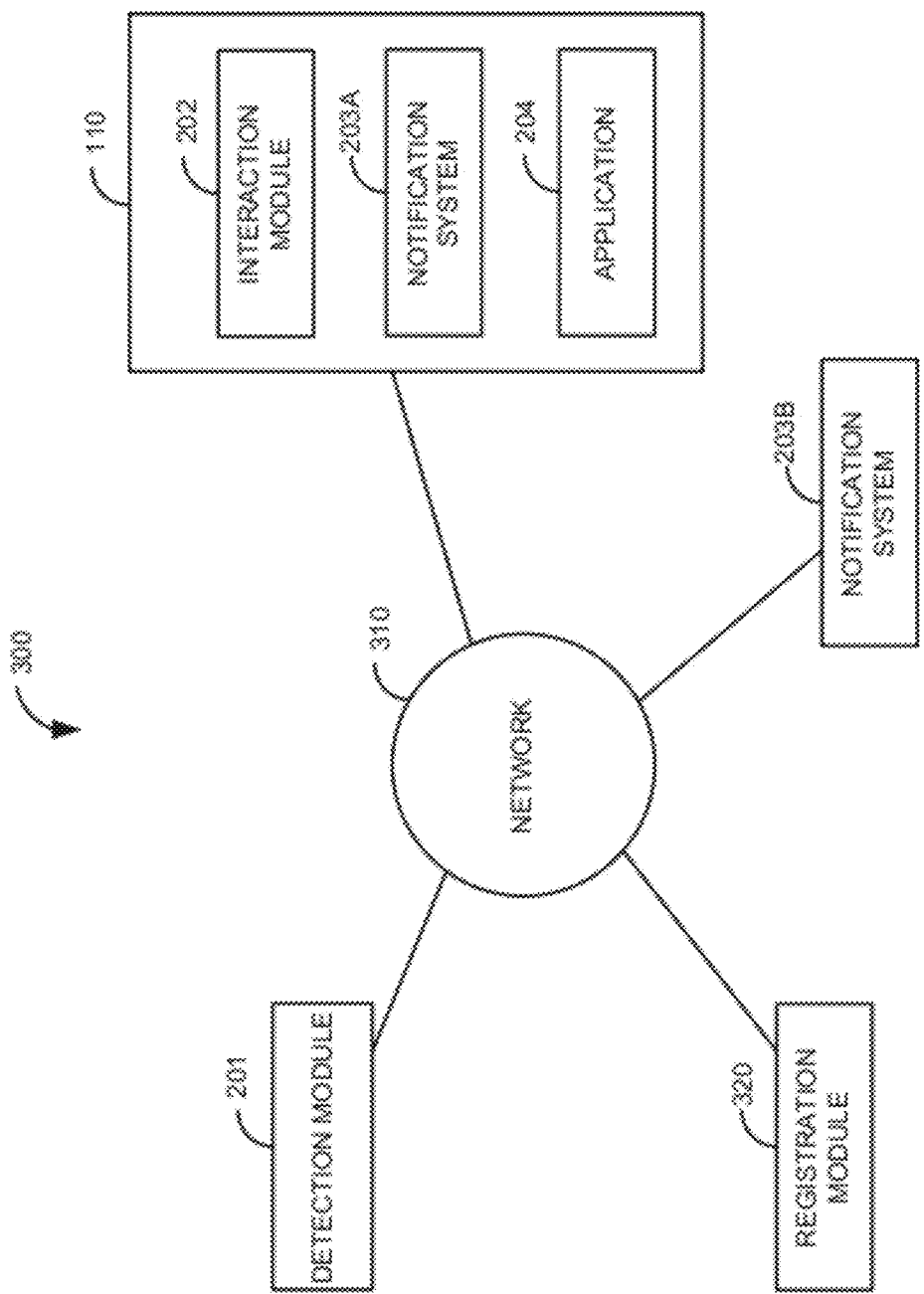
FIG. 3 is a block diagram of a second illustrative system for detecting an approaching impending obstacle and warning a user of a mobile device of the impending obstacle.

FIG. 3 is a block diagram of a second illustrative system 300 for detecting an approaching impending obstacle 120 and warning user 100 of mobile device 110 of the impending obstacle 120. Second illustrative system 300 comprises mobile device 110, detection module 201, notification system 203 (A & B), registration module 320, and network 310.

Network 310 can be any type of network that can interconnect devices/systems, such as a Bluetooth network, a WiFi network, an 802.11 network, a Local Area Network (LAN), the Internet, a wired network, a wireless network, an optical network, a combination of these, and the like. Network 310 can use a variety of protocols and technologies, such as Internet Protocol (IP), X10, HomePlug, Ethernet, circuit switched protocols, and the like. In this example, network 310 connects detection module 201, registration module 320, notification system 203B, and mobile device 110.

Registration module 320 can be any hardware/software that can detect and register mobile device 110. Registration module 320 can detect mobile device 110 using a variety of protocols, such as Bluetooth, WiFi, 802.11, and the like.

Mobile device 110 includes interaction module 202, notification system 203A, and application 204. The second illustrative system 300 can be implemented in various ways that will be obvious to one of ordinary skill in the art and should not be considered limited to what is shown in FIG. 3. To illustrate an exemplary embodiment of FIG. 3, consider the following example. Detection module 201, registration module 320, and notification system 203B are part of a vehicle, such as an automobile, an airplane, a boat, a bus, and the like. Detection module 201 can be a sensor or sensor array that detects potential accidents, such as oncoming cars, a car in the driver's blind spot, a boat approaching at a high speed from the rear, upcoming turbulence in an airplane, and the like. Registration system 320 can be a Bluetooth interface that detects one or more mobile devices 110 in the vehicle (i.e., mobile devices 110 of the driver and passengers in a vehicle). Notification system 203B could be one or more speakers in the vehicle.

To illustrate how second illustrative system 300 works. Assume that detection module 201, registration module 320, and notification system 203B are components of an automobile that interconnect via network 310. Mobile device 110 is a telephone that user 100 can text with (texting application 204), make calls with (telephony application 204), and listen to music (music application 204). When user 100 gets into the automobile, registration module 320 detects user 100's mobile device 110 via a Bluetooth network (part or all of network 310) and registers mobile device 110.

While user 100 drives the automobile, he is texting while listening to music with headphones. Interaction module 202 determines that user 100 is interacting with mobile device 110 because of the texting and listening to music with headphones. Detection module 201 detects that the automobile has veered into the on-coming lane and a truck (an impending obstacle 120) is approaching in the on-coming lane. Detection module 201 sends a message to notification systems 203A and optionally notification system 203B. Notification system 203A interrupts the texting application 204 by displaying a text message on top of the texting application 204 indicating the approaching truck. Likewise, notification system 203A can interrupt the music application 204 and play a warning message that says there is an approaching truck. Notification 203B could also play a message to the user 100 via speakers in the automobile.

The above example describes a scenario where there is only one mobile device 110 (the driver's mobile device 110). The above example can be extended to include registering additional mobile devices 110 of passengers in the automobile. Upon detecting the impending obstacle 120, detection module 201 sends a message to each mobile device 110 where the user 100 is interacting with their mobile device 110. This way, in addition to the driver, each passenger who is interacting with their mobile device 110 will also be notified.

In FIG. 3, interaction module 202 and notification 203A are shown as components of mobile device 110. In other embodiments, interaction module 202 and notification 203A do not have to be part of mobile device 110. For instance, mobile device 110 can be a hand-held scanner/data entry device that a worker uses in a warehouse. Detection module 201 and interaction module 202 can comprise an over-head camera system in the warehouse. Registration module 320 is a system that detects the hand-held scanner/data entry device via a WiFi network. Notification system 203B can be a speaker system in the warehouse.

Detection module 201 and interaction module 202 via the cameras can detect that a worker is interacting with the hand-held scanner/data entry device and is unaware of a forklift approaching. The worker then can be notified via the warehouse speakers of the approaching forklift.

Figure 4:
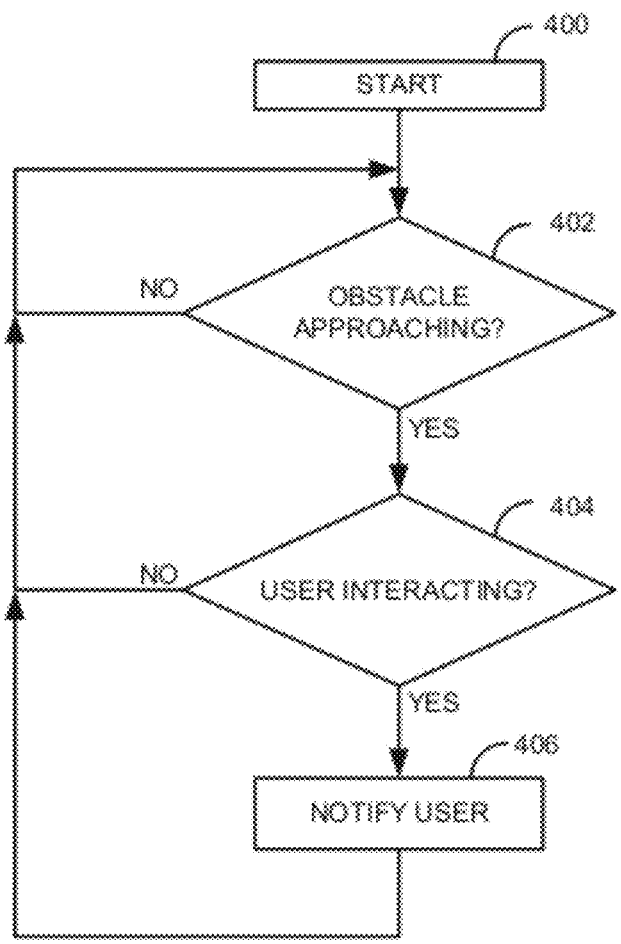
FIG. 4 is a flow diagram of a method for detecting an approaching impending obstacle and warning a user of a mobile device of the impending obstacle.

FIG. 4 is a flow diagram of a method for detecting impending obstacles 120 and warning user 100 of mobile device 110 of impending obstacle 120. Illustratively, mobile device 110, detection module 201, interaction module 202, notification system 203, application 204, and registration module 320 are stored-program-controlled entities, such as a computer or processor, which perform the methods of FIGS. 4-7 and the processes described herein by executing program instructions stored in a tangible computer readable storage medium, such as a memory or disk.

The process starts 400. Detection module 201 determines in step 402 if an impending obstacle 120 is approaching. If an impending obstacle 120 is not approaching, the process repeats step 402. Otherwise, if an impending obstacle 120 is approaching in step 402, interaction module 202 determines in step 404 if user 100 is interacting with mobile device 110. If user 100 is not interacting with mobile device 110 in step 404, the process goes to step 402. Otherwise, if user 100 is interacting with mobile device 110 in step 404, notification system 203 notifies 406 user 100 and the process goes to step 402.

Figure 5:
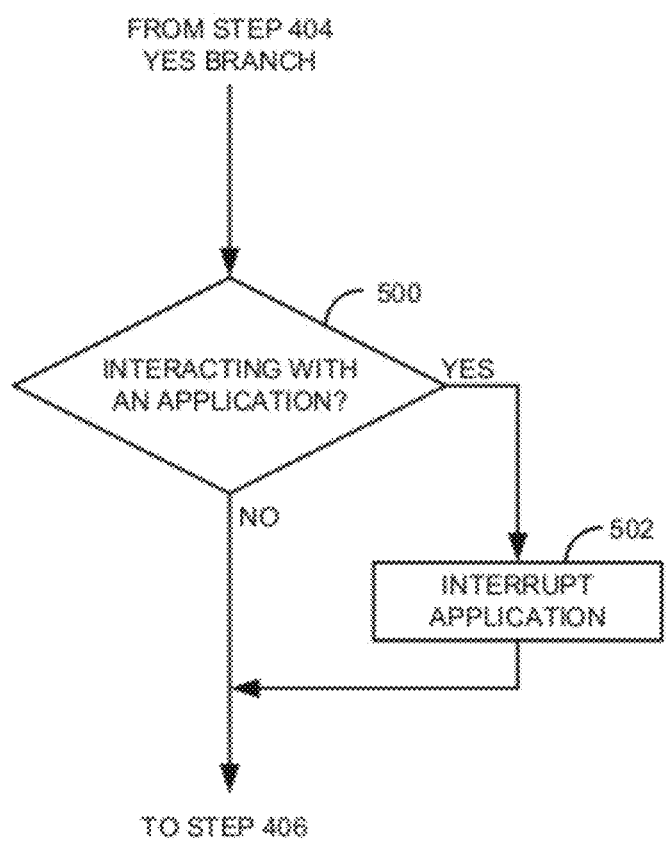

FIG. 5 is a flow diagram of a method for interrupting application 204 that the user 100 is interacting with. FIG. 5 goes between step 404 (yes branch) and step 406. After determining that user 100 is interacting with mobile device 110 in step 404, notification system 203 determines in step 500 if user 100 is interacting with application 204 on the mobile device 110. If user 100 is not interacting with application 204, the process goes to step 406. Otherwise, if user 100 is interacting with application 204 in step 500, notification system 203 interrupts 502 application 204 and the process goes to step 406.

Interrupting application 204 can occur in various ways. For example, if application 204 is a video game, interrupting the video came can include pausing the video game and/or muting the sound. If application 204 is a music application, interrupting the music application would include stopping the music. If there are multiple applications 204 running (e.g., a music application and a texting application), interrupting the application in step 502 may include interrupting one or more of the applications 204.

Figure 6:
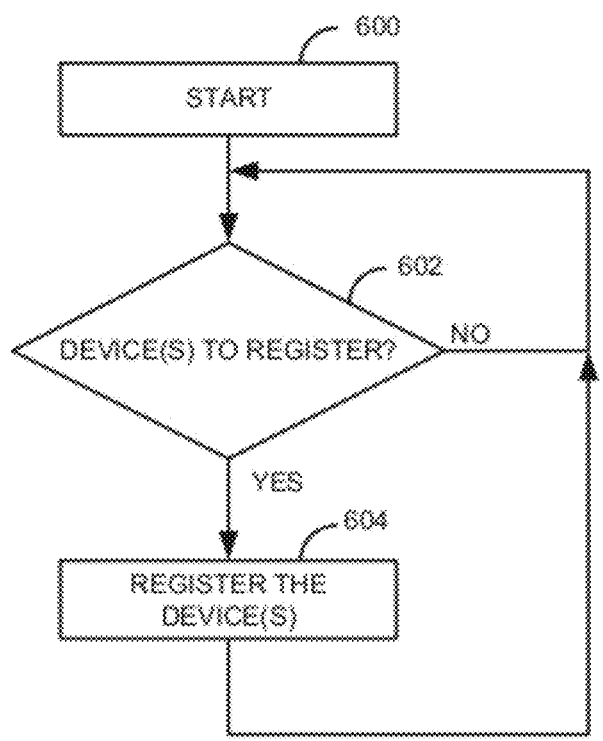
FIG. 6 is a flow diagram of a method for registering one or mobile devices.

FIG. 6 is a flow diagram of a method for registering one or more mobile devices 110. In a distributed system like that shown in FIG. 3, registration module 320 can register one or more mobile devices 110. To do this, after the process has started in step 600, registration module 320 determines in step 602 if there are any mobile devices 110 to register. Registration can be accomplished using protocols such as Bluetooth. Registration can be done automatically upon detection of mobile device 110 or by asking user 100 if he/she wants to register after mobile device 110 is detected by registration module 320. If there are not any mobile devices 110 to register in step 602, the process repeats. Otherwise, if there are one or more devices to register in step 602, registration module 320 registers 604 the mobile devices 110 and the process goes to step 602.

The method of FIG. 6 is shown as a separate process, such as a thread. However, the method of FIG. 6 can be implemented in other ways, such as a polling process.

Registration module 320 registers mobile devices 110 so that if an impending obstacle 120 is detected, a message can be sent (see FIG. 7) from detection module 201 to notification system 203A in mobile device 110 to alert user 100. For example, if there are multiple occupants in an automobile that are each using a mobile device 110, registration module 320 can register each mobile device 110. Detection module 201 can then send a message to each registered mobile device 110.

Figure 7:
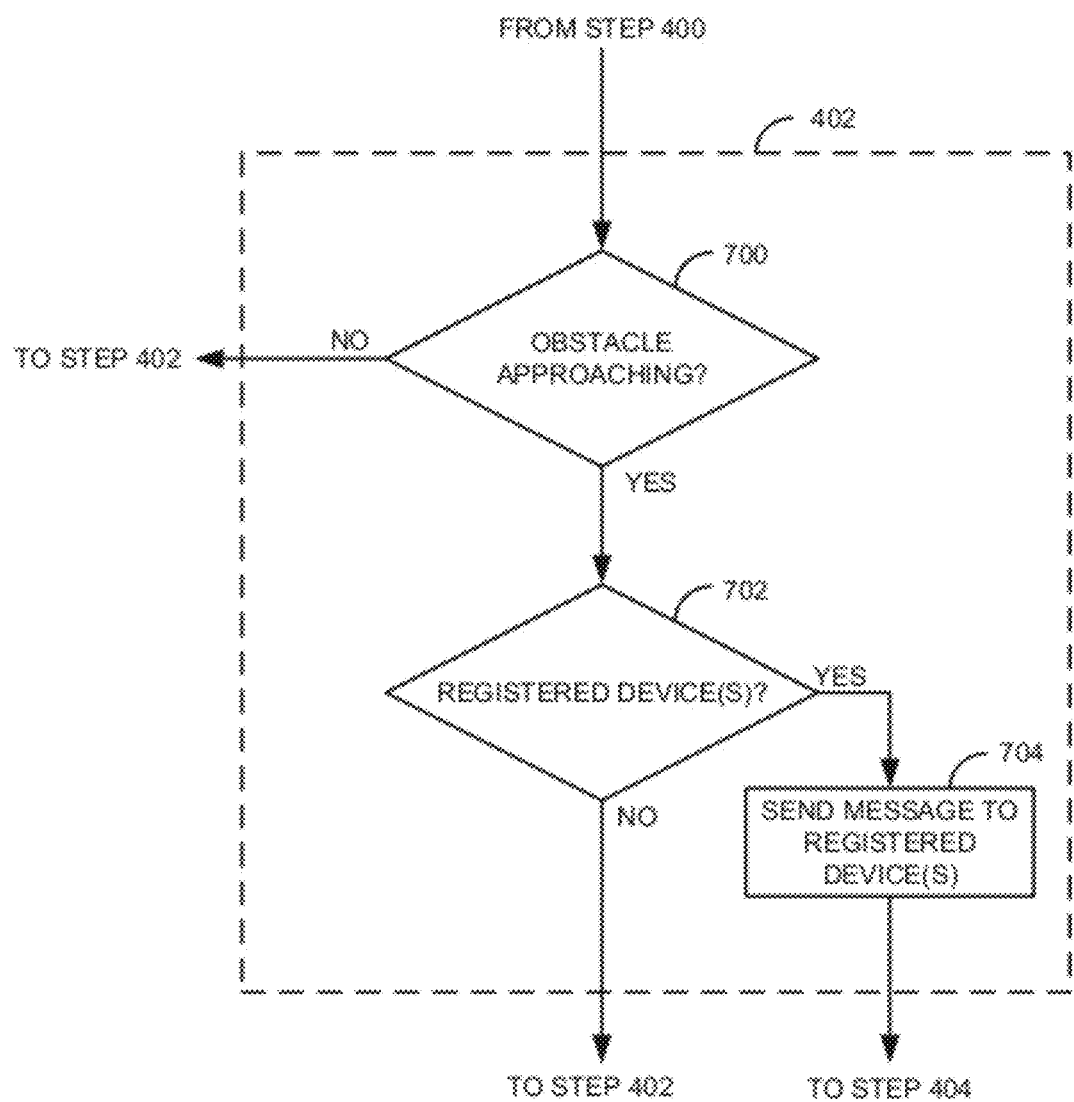
FIG. 7 is a flow diagram of a method for sending messages to registered mobile devices.

FIG. 7 is a flow diagram of a method for sending messages to registered mobile device(s) 110. The method of FIG. 7 is used in a distributed system like that shown in FIG. 3. FIG. 7 is an expanded view of step 402 in FIG. 4. After starting in step 400, detection module 201 detects if there is an approaching impending obstacle 120 in step 700. If there is not an approaching impending obstacle 120 in step 700, the process repeats and goes to step 402.

Otherwise, if there is an approaching impending obstacle 120 in step 700, detection module 201 determines if there are any registered mobile devices 110 (mobile devices 110 registered in step 604) in step 702. If there are not any registered mobile devices 110 in step 702, the process goes to step 402. Otherwise, if there are one or more registered devices in step 702, detection module 201 sends 704 a message to the registered device(s) and the process goes to step 404.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
    detecting in a detection module, an impending obstacle approaching a user of a mobile device;
    determining in an interaction module, that the user of the mobile device is interacting with the mobile device; and
    responsive to detecting the impending obstacle and determining that the user of the mobile device is interacting with the mobile device, notifying by a notification system, the user of the mobile device of the impending obstacle,
    wherein the detecting step is accomplished at least in part by high frequency echo location, sound recognition, or voice recognition.

2. The method of claim 1, wherein the notifying step comprises: interrupting an application on the mobile device that the user is interacting with and notifying the user with one or more of the following: a text message, an audio message, an audible alarm, and a vibration.

3. The method of claim 1, wherein the detection module is a system in a vehicle, the notification system and the interaction module are in the mobile device, the notifying step further comprises sending a message from the detection module to the notification system indicating the impending obstacle, and further comprising the step of registering, with a registration module, the mobile device.

4. The method of claim 3, wherein the registration step comprises registering a plurality of mobile devices, each with a user, wherein the message is sent to the plurality of mobile devices, and the notifying step further comprises notifying each user of the plurality of mobile devices.

5. The method of claim 1, wherein the detecting step is accomplished by one or more cameras in the mobile device and the notification system is in the mobile device.

6. The method of claim 1, wherein the interacting step is accomplished at least in part by sound recognition, or voice recognition.

7. The method of claim 1, wherein the detected impending obstacle is either in front of the user of the mobile device, behind the user of the mobile device, or at a side of the user of the mobile device.

8. The method of claim 1, wherein at least one of the following elements are external to the mobile device: a. the interaction module; b. the detection module; and c. the notification system.

9. The method of claim 1, wherein the interaction module, the detection module, and the notification system are all external to the mobile device.

10. A system comprising:
    a detection module configured to detect an impending obstacle approaching a user of a mobile device;
    an interaction module configured to determine that the user of the mobile device is interacting with the mobile device; and
    a notification system configured to notify the user of the mobile device of the impending obstacle in response to detecting the impending obstacle and determining that the user of the mobile device is interacting with the mobile device,
    wherein the detecting an impeding obstacle is accomplished at least in part by high frequency echo location, sound recognition, or voice recognition.

11. The system of claim 10, wherein the notification system is further configured to interrupt an application on the mobile device that the user is interacting with and notify the user with one or more of the following: a text message, an audio message, an audible alarm, and a vibration.

12. The system of claim 10, wherein the detection module is a system in a vehicle, the notification system and the interaction module are in the mobile device, the detection module is further configured to send a message to the notification system indicating the impending obstacle, and further comprising a registration module configured to register the mobile device.

13. The system of claim 12, wherein the registration module registers a plurality of mobile devices, each with a user, wherein the message is sent to the plurality of mobile devices, and the notifying step further comprises notifying each user of the plurality of mobile devices.

14. The system of claim 10, wherein the detection module comprises one or more cameras in the mobile device and the notification system is in the mobile device.

15. The system of claim 10, wherein the interaction step is accomplished at least in part by sound recognition, or voice recognition.

16. The system of claim 10, wherein the detected impending obstacle is either in front of the user of the mobile device, behind the user of the mobile device, or at the side of the user of the mobile device.

17. The system of claim 10, wherein at least one of the following elements are external to the mobile device: a. the interaction module; b. the detection module; and c. the notification system.

18. The system of claim 10, wherein the interaction module, the detection module, and the notification system are all external to the mobile device.

19. A computer readable medium having stored thereon instructions that cause a processor to execute a method, the method comprising: instructions to detect an impending obstacle approaching a user of a mobile device; instructions to determine that the user of the mobile device is interacting with the mobile device; and responsive to detecting the impending obstacle and determining that the user of the mobile device is interacting with the mobile device, instructions to notify the user of the mobile device of the impending obstacle, wherein the detecting step is accomplished at least in part by high frequency echo location, sound recognition, or voice recognition.

* * * * *